(12) United States Patent
Yamada et al.

(10) Patent No.: US 7,776,484 B2
(45) Date of Patent: Aug. 17, 2010

(54) SEPARATOR FOR FUEL CELL, METHOD FOR PRODUCING SEPARATOR, AND SOLID OXIDE FUEL CELL

(75) Inventors: Takashi Yamada, Naka (JP); Masaharu Yamada, Naka (JP); Taner Akbay, Naka (JP); Koji Hoshino, Naka (JP); Takashi Miyazawa, Naka (JP); Takafumi Kotani, Naka (JP); Norikazu Komada, Naka (JP); Naoya Murakami, Naka (JP)

(73) Assignees: Mitsubishi Materials Corporation, Tokyo (JP); The Kansai Electric Power Co., Inc., Osaka (JP)

( * ) Notice: Subject to any disclaimer, the term of this patent is extended or adjusted under 35 U.S.C. 154(b) by 921 days.

(21) Appl. No.: 10/585,940

(22) PCT Filed: Jan. 13, 2005

(86) PCT No.: PCT/JP2005/000295
§ 371 (c)(1),
(2), (4) Date: Jul. 13, 2006

(87) PCT Pub. No.: WO2005/069415
PCT Pub. Date: Jul. 28, 2005

(65) Prior Publication Data
US 2007/0160892 A1 Jul. 12, 2007

(30) Foreign Application Priority Data

| Jan. 16, 2004 | (JP) | 2004-009061 |
| Jan. 16, 2004 | (JP) | 2004-009062 |
| Sep. 16, 2004 | (JP) | 2004-269456 |
| Dec. 28, 2004 | (JP) | 2004-379098 |
| Dec. 28, 2004 | (JP) | 2004-379099 |

(51) Int. Cl.
 H01M 2/14 (2006.01)
 H01M 2/00 (2006.01)
 H01M 2/02 (2006.01)

(52) U.S. Cl. .............. 429/454; 429/465; 429/486
(58) Field of Classification Search ............ 429/38
See application file for complete search history.

(56) References Cited

U.S. PATENT DOCUMENTS 6,179,816 B1 * 1/2001 Mottola et al. .............. 604/264

(Continued)

FOREIGN PATENT DOCUMENTS

JP 59-75575 4/1984

(Continued)

*Primary Examiner*—Dah-Wei D Yuan
*Assistant Examiner*—Jacob Marks
(74) *Attorney, Agent, or Firm*—Wenderoth, Lind & Ponack L.L.P.

(57) ABSTRACT

Gas discharge ports are provided in almost the entire area of a layer surface of a separator, and a gas for reaction is discharged like a shower from the separator toward a power generation cell. The separator is constructed by layering plate-shaped members containing iron-base alloy, nickel-base alloy, or chrome-base alloy as the base material. Silver, silver alloy, copper, or copper alloy is plated on both sides or one side of the base material of the plate-shaped member. The construction above can increase durability of a separator and enables the separator and a solid oxide fuel cell to be stably used for a long period.

3 Claims, 10 Drawing Sheets

U.S. PATENT DOCUMENTS

| | | | |
|---|---|---|---|
| 6,670,069 B2 * | 12/2003 | Allen | 429/37 |
| 2001/0028974 A1 * | 10/2001 | Nakata et al. | 429/34 |
| 2003/0134174 A1 * | 7/2003 | Akikusa et al. | 429/38 |
| 2004/0043270 A1 * | 3/2004 | Tsunoda | 429/32 |
| 2005/0221161 A1 * | 10/2005 | Komada et al. | 429/39 |

FOREIGN PATENT DOCUMENTS

| | | | |
|---|---|---|---|
| JP | 2002-203588 | | 7/2002 |
| JP | 2002-305005 | | 10/2002 |
| WO | WO 03075384 | * | 9/2003 |

* cited by examiner

SEPARATOR FOR FUEL CELL, METHOD FOR PRODUCING SEPARATOR, AND SOLID OXIDE FUEL CELL

BACKGROUND OF THE INVENTION

I. Technical Field

The present invention relates to a separator for a fuel cell, a method for producing the separator, and a solid oxide fuel cell (SOFC).

II. Description of the Related Art

As is well known, the solid oxide fuel cell has been investigated and developed as one of various kinds of fuel cells for power generation. As the structure of the solid oxide fuel cell, there are proposed at present three types of structures: a cylindrical type, a monolithic type, and a flat plate laminated type. However, the flat plate laminated type structure is widely adopted for low-temperature operating type solid oxide fuel cell.

In the flat plate laminated type solid oxide fuel cell, a fuel cell stack is constituted by alternately laminating power generation cells and separators in a state where a current collector is sandwiched between the power generation cell and the separator. The power generation cell has a laminated structure in which a solid electrolyte layer made of an oxide ion conductor is sandwiched between an air electrode (cathode) layer and a fuel electrode (anode) layer. Oxygen (air) as oxidizer gas is supplied to the air electrode side of the power generation cell, while fuel gas ($H_2$, $CH_4$ and the like) is supplied to the fuel electrode side. Both the air electrode and the fuel electrode are made porous so as to enable the oxygen and the fuel gas to reach their boundary with the solid electrolyte.

On the other hand, the separator has a function of electrically connecting the power generation cells to each other and of supplying reactive gas to the power generation cell, and is provided with a fuel passage which introduces fuel gas from an outer peripheral part and which discharges the fuel gas from a surface facing the fuel electrode layer, and with oxidizer passage which introduces air as oxidizer gas from an outer peripheral part and which discharges the air from a surface facing the air electrode layer. An air electrode current collector made of a sponge-like porous sintered metallic plate such as an Ag-based alloy is arranged between the separator and the air electrode of the power generation cell, and a fuel electrode current collector made of a sponge-like porous sintered metallic plate such as a Ni-based alloy is arranged between the separator and the fuel electrode of the power generation cell.

In the solid oxide fuel cell constituted as described above, the oxygen supplied to the air electrode side of the power generation cell via the separator and the air electrode current collector reaches near the boundary with the solid electrolyte through the pore in the air electrode layer, and there, the oxygen receives an electron from the air electrode to be ionized to oxide ion ($O^{2-}$). The oxide ion is diffusively moved in the solid electrolyte toward the direction of the fuel electrode. When reaching near the boundary with the fuel electrode, the oxide ion reacts there with fuel gas to produce a reaction product ($H_2O$ and the like), and emits an electron to the fuel electrode. The electron is taken out by the fuel electrode current collector, and thereby current is made to flow and a predetermined electromotive force can be obtained.

Meanwhile, the solid oxide fuel cell of this type includes a solid oxide fuel cell having a seal-less structure to eliminate a gas leakage prevention seal (for which a glass seal is conventionally used) in the outer peripheral part of the power generation cell. The solid oxide fuel cell having the seal-less structure is arranged in such a manner that discharge ports of fuel gas and oxidizer gas (reactive gas) are provided in the center part of the separator, that while the reactive gas discharged from the discharge port is made to diffuse in the outer peripheral direction of the power generation cell, the reactive gas is made to spread in excellent distribution over a whole part of the fuel electrode layer and the air electrode layer so as to generate power generation reaction, and that the gas generated by the power generation reaction and the remaining gas not used in the power generation reaction is exhausted from the outer peripheral part of the power generation cell to the outside (for example, see Japanese Patent Laid-Open No. 11-016581).

However, in the solid oxide fuel cell having the above described seal-less structure, when the reactive gas discharge port is provided in the center part of the separator, there occurs a phenomenon in which gas concentration with a peak at the center part near the discharge port is reduced toward the outer peripheral part. This results in a problem that electrode reaction may not be uniform on the cell face to cause deviation of current density distribution within the cell face and thereby the efficiency of the power generation cell (output power density per unit area) may be remarkably decreased. Further, the electrode reaction as exothermic reaction which is not uniformly performed within the cell face, causes a temperature gradient to be formed in the power generation cell, as a result of which the power generation cell may be damaged by thermal stress in the course of the reaction.

On the other hand, in the flat plate laminated type solid oxide fuel cell, when the operating temperature is set to a low temperature not higher than 800° C., a separator made of stainless steel is often adopted as the above described separator.

However, the fuel cell in which the separator made of stainless steel is adopted, has a problem that when a hydrocarbon compound, such as methane, is used as fuel gas, carbon and carbon oxide are generated by reforming reaction, so that a part exposed to the fuel gas, such as the fuel passage wall surface of the separator, is carburized by the reaction product and thereby the separator deteriorates in the early stage.

SUMMARY OF THE INVENTION

The present invention has been made in view of the above described circumstances. The principal object of the present invention is to provide a separator for fuel cell and a solid oxide fuel cell which are excellent in durability and can be used stably over a long period. More specifically, a first object of the present invention is to provide a separator for fuel cell and a solid oxide fuel cell which are capable of providing uniform gas concentration to the cell face and thereby improving the power generation efficiency, and which are capable of causing uniform temperature within the cell face and thereby preventing the power generation cell from being damaged. A second object of the present invention is to provide a separator for fuel cell which is excellent in carburizing resistance and which is capable of suppressing deterioration caused by carburization even when a hydrocarbon compound such as methane is used as fuel gas, and to provide a method for producing the separator, and a solid oxide fuel cell using the separator.

In order to achieve the above described object, a separator for fuel cell according to a first aspect of the present invention, which is arranged in alternate lamination with a power generation cell and has gas discharge ports (openings), for discharging reactive gas, on a layer surface thereof (a surface facing the power generation cell), is characterized in that the multiple gas discharge ports are provided on approximately whole area of the layer surface and that the reactive gas is made to be discharged like a shower from the separator toward the power generation cell. Further, the solid oxide fuel cell according to the first aspect of the present invention, which has a fuel cell stack formed by alternately laminating the power generation cells and the separators and which supplies reactive gas to each of the power generation cells so as to generate power generation reaction, is characterized in that the separator for fuel cell according to the first aspect of the present invention is used as the separator of the fuel cell stack.

Here, the above described separator can be constituted, for example, in such a manner that a hollow part for receiving the reactive gas is provided, and that the reactive gas is guided to each of the gas discharge ports via the hollow part.

The method for arranging the above described gas discharge ports includes, for example, a method for arranging the gas discharge ports along multiple virtual lines radially extended from a position of a gas inlet, respectively, a method for arranging the gas discharge ports along multiple virtual concentric circles centered at the gas inlet, respectively, a method for arranging the gas discharge ports along multiple virtual lines radially extended from the center part of the layer surface, and a method for arranging the gas discharge ports along multiple virtual concentric circles having a center in the center part of the layer surface, respectively.

Alternatively, the separator may be arranged to be provided with an inner flow passage for guiding the reactive gas so that the gas discharge ports are formed along the inner flow passage. In this case, the inner flow passage can be formed as a spiral flow passage having a starting point in the outer peripheral part of the separator, or as a flow passage deflected in a zigzag state from one end toward the other end in the radial direction of the layer surface. Further, the inner flow passage can be formed by multiple flow passages radially branched from the gas inlet in the outer peripheral part. In any case, the hole diameter of the gas discharge ports is preferably set to become large from the upstream side toward the downstream side of the inner flow passage.

Further, the wall surface of the hollow part and the inner flow passage is preferably subjected to an aluminum diffusion coating treatment for making aluminum diffused and penetrated.

According to the first aspect of the present invention, multiple gas discharge ports are provided on approximately whole area of the layer surface of the separator, and the reactive gas (fuel gas, oxidizer gas) is made to be discharged like a shower from the gas discharge ports toward the power generation cell, as a result of which the gas concentration on the cell face can be made uniform. Therefore, deviation in the electrode reaction can be suppressed and current density within the cell can be made uniform, with the result that the output power density per unit area is increased so as to enable the power generation efficiency of the power generation cell as a whole to be remarkably improved, and that temperature distribution within the cell face is made uniform so as to prevent mechanical failure by thermal stress in the power generation cell.

Further, the wall surface of the hollow part and the inner flow passage of the separator, which surface is exposed to the reactive gas, are subjected to the aluminum diffusion coating treatment, so that it is possible to remarkably improve high temperature corrosion resistance of the wall surface, and to prevent deterioration of the separator caused by oxidization and carburization.

The separator for fuel cell according to a second aspect of the present invention, which is formed by laminating multiple plate-shaped members including a plate-shaped member provided with a groove hole (or a slit), and in which the opening of the groove hole is made to be covered by laminating the plate-shaped members and thereby the inner flow passage for guiding the reactive gas is formed, is characterized in that an iron based alloy, a nickel based alloy or a chromium based alloy is used as a base material of the plate-shaped member, and the both surfaces of the base material are plated with silver, a silver alloy, copper or a copper alloy, or in that an iron based alloy, a nickel based alloy or a chromium based alloy is used as a base material of the plate-shaped member, and each one of the surfaces of the multiple plate-shaped members which are brought into contact with each other at the time of lamination, is plated with silver, a silver alloy, copper or a copper alloy. Further, the solid oxide fuel cell according to the second aspect of the present invention, which has a fuel cell stack formed by alternately laminating the power generation cells and the separators and which supplies the reactive gas to each of the power generation cells to generate power generation reaction, is characterized by using the separator for fuel cell according to the second aspect of the present invention as the separator of the fuel cell stack.

Here, as a method for producing the above described separator, it is possible to adopt a method comprising: plating one or both surfaces of an iron based alloy, a nickel based alloy or a chromium based alloy used as the base material of the plate-shaped members, with silver, a silver alloy, copper, or a copper alloy; forming the plate-shaped members by pressing the base material, respectively; and thereafter laminating the formed plate-shaped members and making the plate-shaped members mutually joined and integrated by softening or melting the plated material on the layer surface.

Note that instead of the plating treatment using silver, a silver alloy, copper or a copper alloy, the aluminum diffusion coating treatment for making aluminum dispersed and penetrated through the surface of the base material made of an iron based alloy, a nickel based alloy or a chromium based alloy, may be arranged to be applied to the wall surface of the inner flow passage.

According to the second aspect of the present invention, all the surfaces exposed to the fuel gas, which include not only the surface of the separator but also the wall surface of the inner flow passage and the like, are plated with silver, copper, or one of silver and copper alloys, as a result of which carburizing resistance of the separator can be remarkably improved, and deterioration of the separator caused by carburization can be suppressed even when methane gas and the like is used as the fuel gas.

Further, one or both surfaces of the plate-shaped member are arranged to be plated with silver, copper, or one of silver and copper alloys, so that the plate-shaped members can be easily joined to each other by softening or melting the plating material on the layer surface of the plate-shaped members by heating the separator, as a result of which the production efficiency of the separator can be improved.

Further, the wall surface of the inner flow passage is arranged to be subjected to the aluminum diffusion coating treatment instead of the plating treatment of silver, copper, or one of silver and copper alloys, so that high temperature corrosion resistance of the separator can be further improved.

DETAILED DESCRIPTION OF THE INVENTION

First Embodiment

Figure 1:
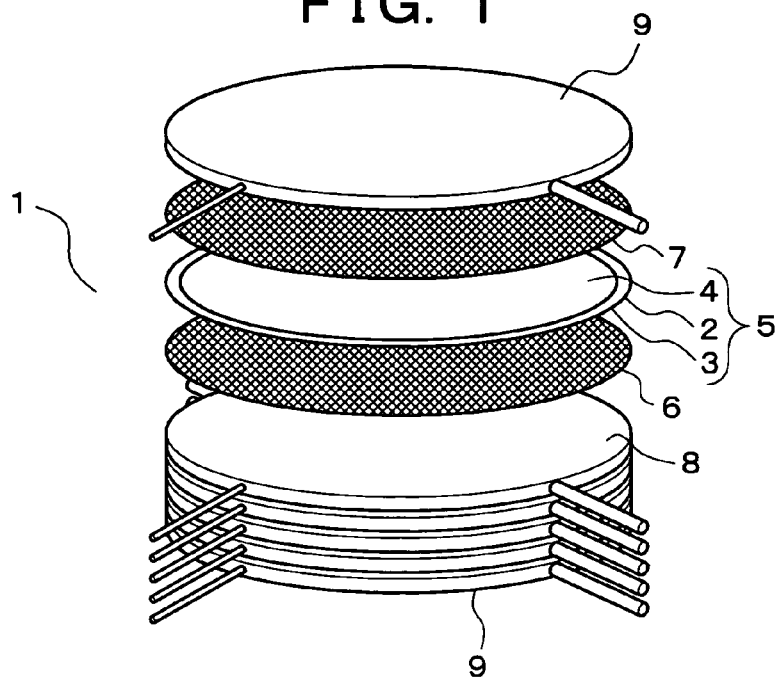
FIG. 1 is an exploded perspective view showing a first embodiment of a solid oxide fuel cell according to the present invention.

FIG. 1 shows a first embodiment of a solid oxide fuel cell according to the present invention, and reference numeral 1 in FIG. 1 denotes a fuel cell stack. As shown in FIG. 1, the fuel cell stack has a constitution formed by laminating in order a power generation cell 5 in which a fuel electrode layer 3 and an air electrode layer 4 are arranged on both surfaces of a solid electrolyte layer 2, a fuel electrode current collector 6 on the outer side of the fuel electrode layer 3, an air electrode current collector 7 on the outer side of the air electrode layer 4, separators 8, (the uppermost and lowermost layer of which are formed as end plates 9), on the outer side of each of the current collectors 6, 7. In the fuel cell stack 1, a seal-less structure in which a gas leakage prevention seal is not particularly provided in the outer peripheral part of the power generation cell 5 is adopted.

Here, the solid electrolyte layer 2 is formed of stabilized zirconia (YSZ) doped with yttria, and the like. The fuel electrode layer 3 is formed of a metal such as Ni, Co, or a cermet such as Ni—YSZ, Co—YSZ. The air electrode layer 4 is formed of $LaMnO_3$, $LaCoO_3$ and the like. The fuel electrode current collector 6 is formed of a sponge-like porous sintered metallic plate such as a Ni-based alloy, and the air electrode current collector 7 is formed of a sponge-like porous sintered metallic plate such as an Ag-based alloy.

Figure 2:
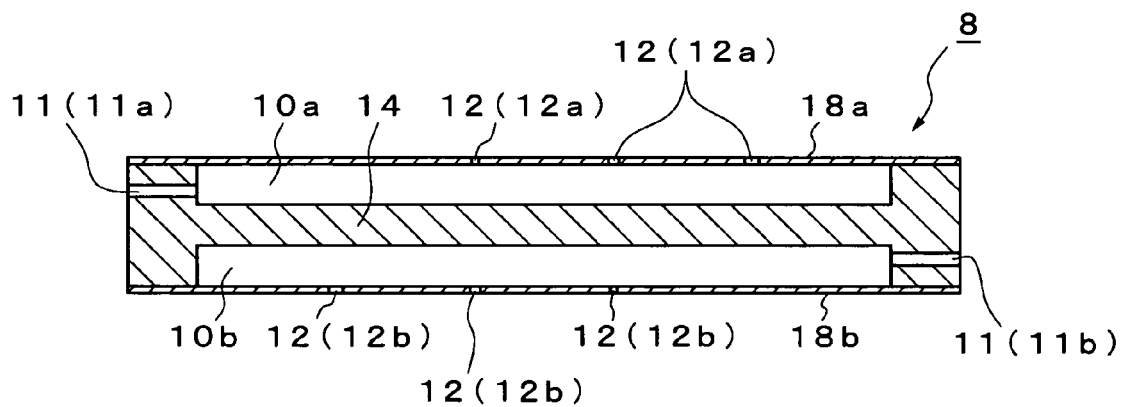
FIG. 2 is a longitudinal sectional view showing the separator in FIG. 1.
Figure 3:
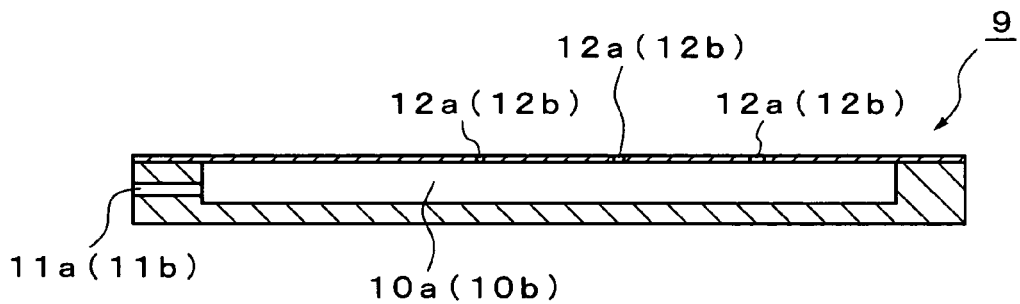
FIG. 3 is a longitudinal sectional view showing the end plate in FIG. 1.

The separator 8 is formed into an approximately disk shape by using stainless steel and the like. As shown in FIG. 2, first and second hollow parts 10a, 10b are provided inside the separator 8, and these hollow parts 10a, 10b are separated by a partition wall 14. A gas inlet 11a which introduces fuel gas into the first hollow part 10a from a manifold for fuel (not shown), and a gas inlet 11b which introduces air as oxidizer gas into the second hollow part 10b from a manifold for oxidizer (not shown) are provided in the outer peripheral part of the separator 8. Further, multiple gas discharge ports 12a, 12b for discharging reactive gas introduced from the gas inlets 11a, 11b into each of the hollow parts 10a, 10b, are provided on layer surfaces (surfaces facing the power generation cells 5) 18a, 18b of the separator 8 so as to be spread on approximately whole area of the layer surface, and thereby the reactive gas is discharged like a shower toward the power generation cell 5 from the gas discharge ports 12a, 12b. Note that in the case of the end plate 9, as shown in FIG. 3, one of the first and second hollow parts 10a, 10b is provided in the end plate, and multiple gas discharge ports 12a, 12b are provided on the face adjacent to the current collectors 6, 7.

In the present embodiment, stainless steel (an iron based alloy) is used as a base material of the separator 8, and an aluminum diffusion coating treatment is applied to the wall surface (the surface of the base material) of the first hollow part 10a and the second hollow part 10b which are formed in the separator 8. The aluminum diffusion coating treatment which is a metal surface treatment for making aluminum diffused and penetrated through the surface of the base material and thereby forming a Fe—Al alloy layer, is performed, for example, in such a manner that the base material is filled into a steel sealed case along with a mixing agent consisting of Fe—Al alloy powder and $NH_4Cl$ powder so as to be heat-treated. The Fe—Al alloy layer enables high temperature oxidation resistance and carburizing resistance of the wall surface to be remarkably improved.

As the arrangement pattern of the gas discharge ports 12 (12a, 12b), for example, arrangement patterns as shown in FIG. 4 to FIG. 7 can be adopted.

Figure 4:
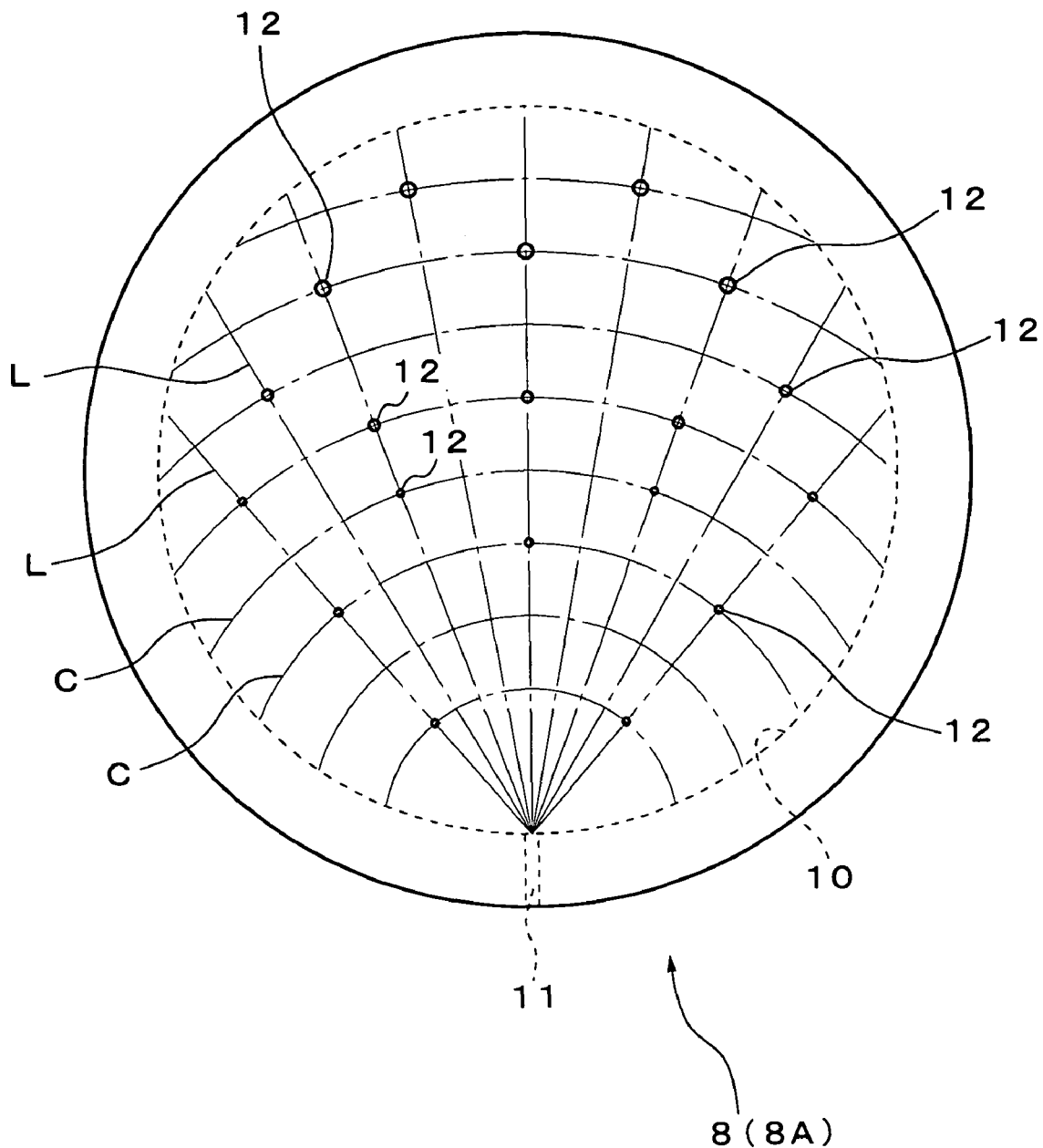
FIG. 4 is a plan view showing an example of an arrangement pattern of gas discharge ports.

In the separator 8A shown in FIG. 4, the gas discharge ports 12 are arranged along multiple virtual lines L radially extending from the position of the gas inlet 11 (11a, 11b), or along multiple virtual concentric circles (circular arc) C centered at the gas inlet 11. That is, in the separator 8A, the gas discharge ports 12 are arranged at positions where each of the virtual lines L and each of the virtual concentric circles C cross with each other. In the separator 8A, the angle formed by the virtual lines L adjoining to each other is set to be constant, and the interval between the concentric circles C adjoining to each other is set to be constant. Further, three kinds of large, medium and small hole diameters are prepared for the gas discharge ports 12, and the hole diameter of the gas discharge port 12 is set so as to become large as the gas discharge port is separated apart from the gas inlet 11. That is, each of the hole diameters is set so as to make the gas discharge quantity of each of the gas discharge ports 12 constant.

Figure 5:
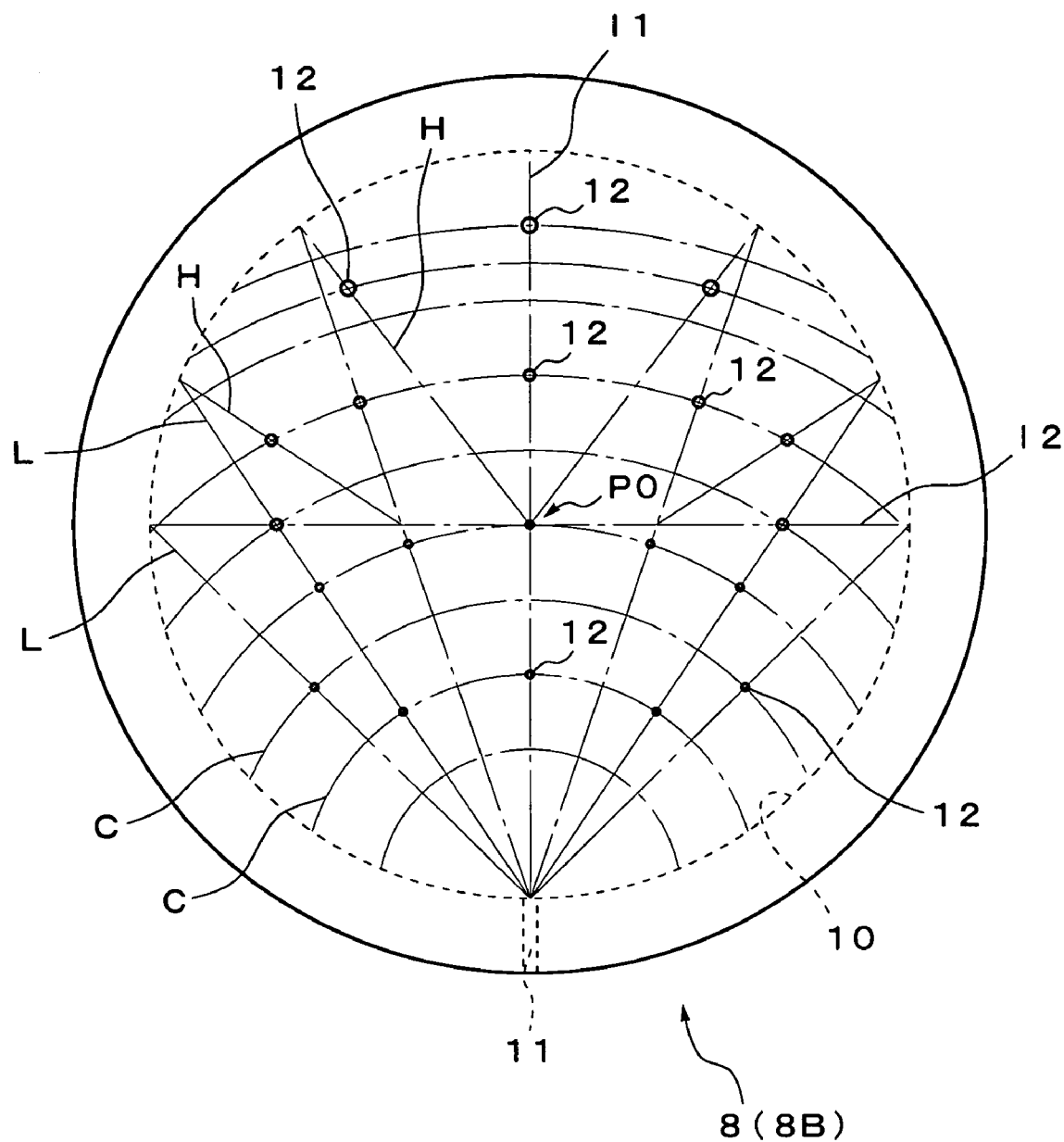
FIG. 5 is a plan view showing an example of an arrangement pattern of gas discharge ports.

Further, in the separator 8B shown in FIG. 5, the gas discharge ports 12 are provided at positions where each of the virtual lines L and each of the virtual concentric circles C cross with each other, similarly to the separator 8A shown in FIG. 4. In the separator 8B shown in FIG. 5, in which a line segment passing through the gas inlet 11 and the center point P of the separator 8B is set as a first line segment 11, and in which a line segment perpendicularly intersecting the first line segment 11 at the center point P and having a length corresponding to the diameter of the hollow part 10 is set as a second line segment 12, a multiple virtual lines L are radially drawn from the gas inlet 11 so as to pass through each of dividing points for dividing the second line segment 12 at an equal interval. Further, in the separator 8B, the gas discharge ports 12 are also provided on auxiliary line segments H extending from the dividing points in the outer circumferential direction (the direction of points at which the outer circumference of the hollow part 10 intersects the virtual lines L).

Figure 6:
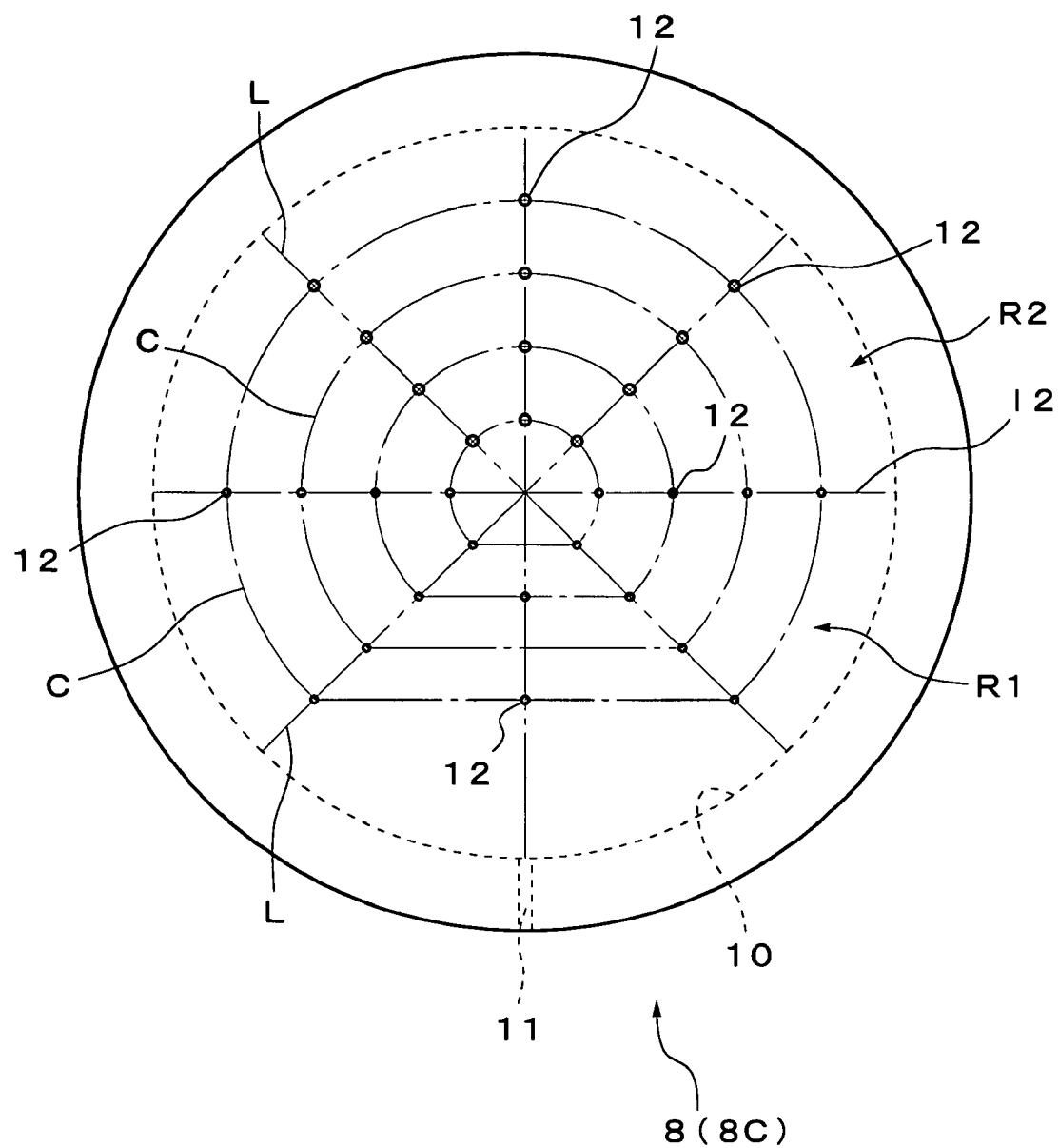
FIG. 6 is a plan view showing an example of an arrangement pattern of gas discharge ports.
Figure 7:
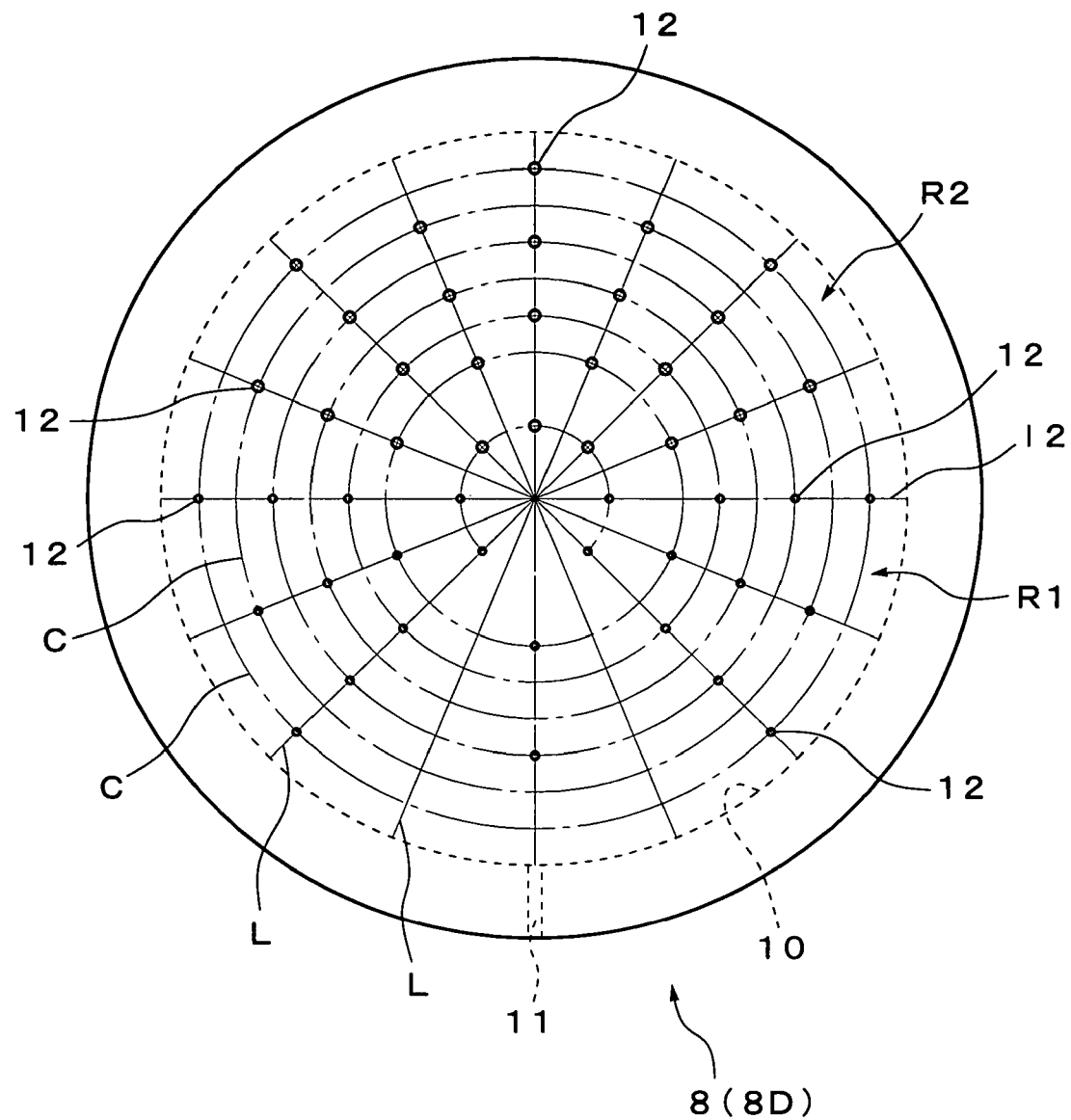
FIG. 7 is a plan view showing an example of an arrangement pattern of gas discharge ports.

On the other hand, in the separators 8C, 8D shown in FIG. 6 and FIG. 7, the gas discharge ports 12 are respectively arranged along multiple virtual lines L radially extending from the center part of the separators 8C, 8D, or along the multiple virtual concentric circles C having their center in the center part of the separators 8C, 8D. In the separators 8C, 8D, the angle formed by virtual lines L adjoining to each other is set to be constant, and the interval between the virtual concentric circles C adjoining to each other is also set to be constant. Further, two kinds of large and small hole diameters are prepared for the gas discharge ports 12, so that the gas discharge ports having the small hole diameter are used for the gas discharge ports 12 existing in a region R1 on the side of the gas inlet 11 of the two regions into which the separator is divided by the second line segment 12 as a boundary, and for the gas discharge ports 12 on the second virtual line segment, while the gas discharge ports having the large hole diameter are used for the gas discharge ports 12 existing in the region R2 opposite to the gas inlet 11. That is, the hole diameter of the gas discharge port 12 is set so as to become large as the distance between the gas discharge port 12 and the gas inlet 11 increases.

Figure 8:
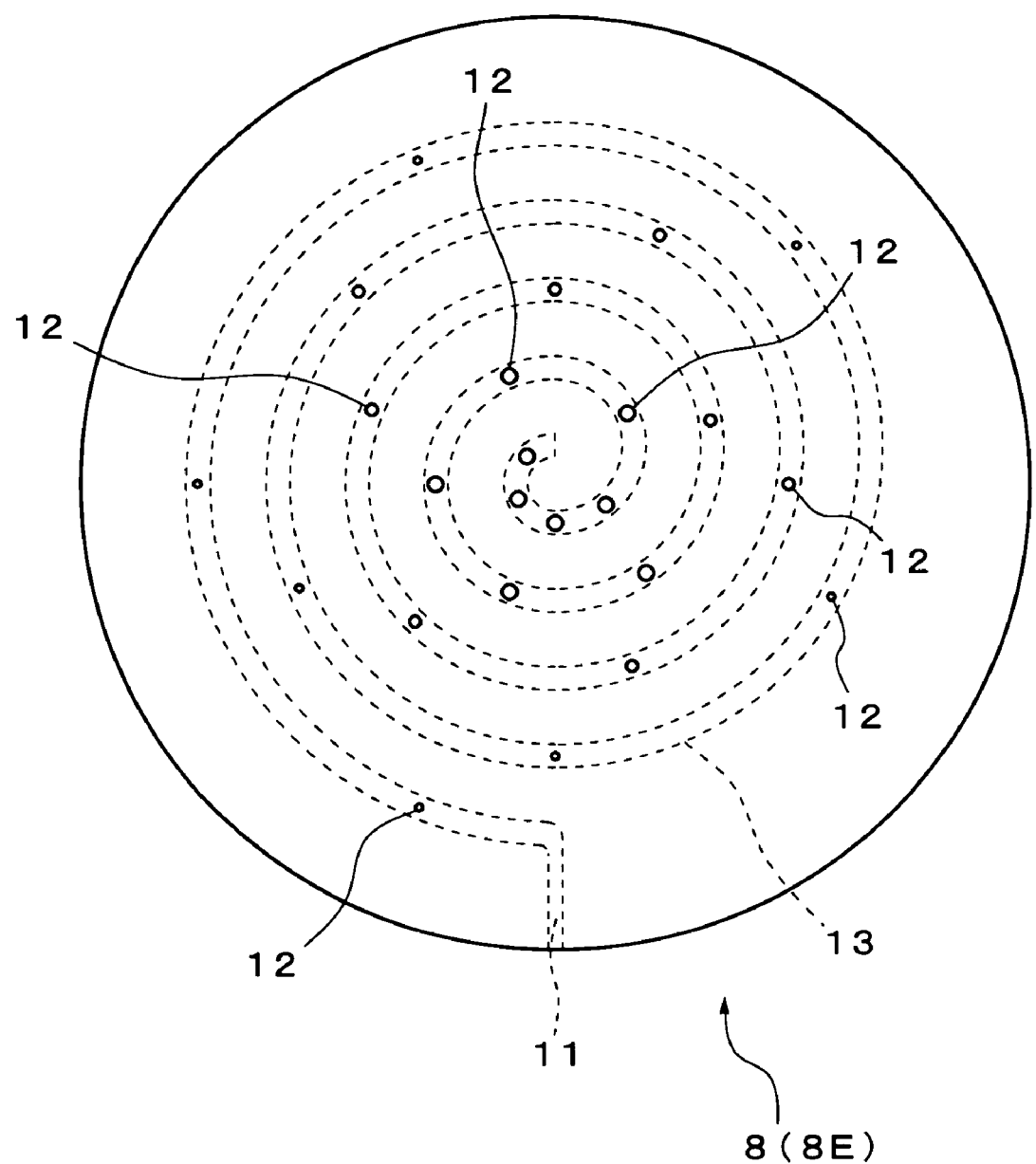
FIG. 8 is a plan view showing a modification of the separator in FIG. 2.
Figure 9:
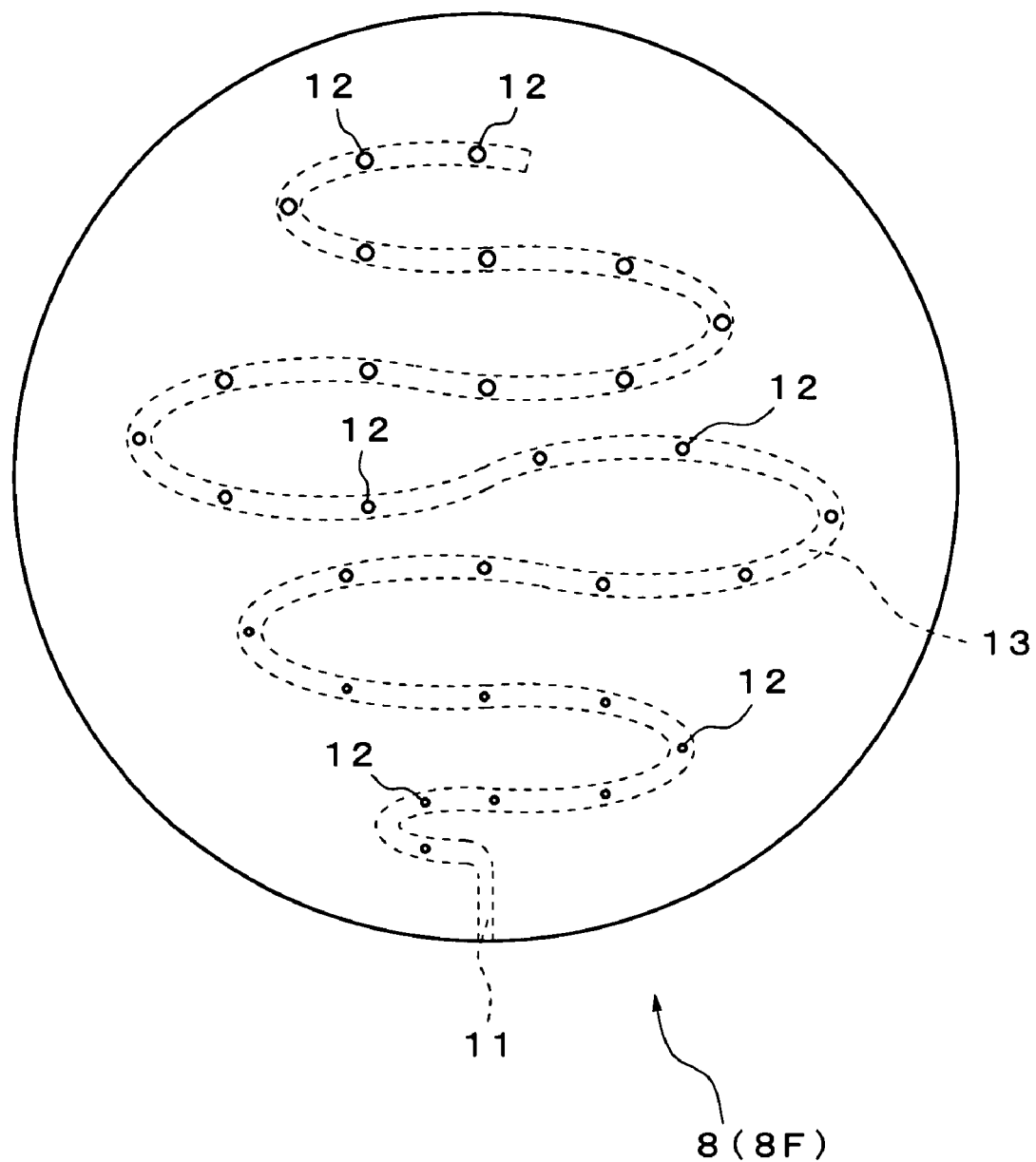
FIG. 9 is a plan view showing a modification of the separator in FIG. 2.
Figure 10:
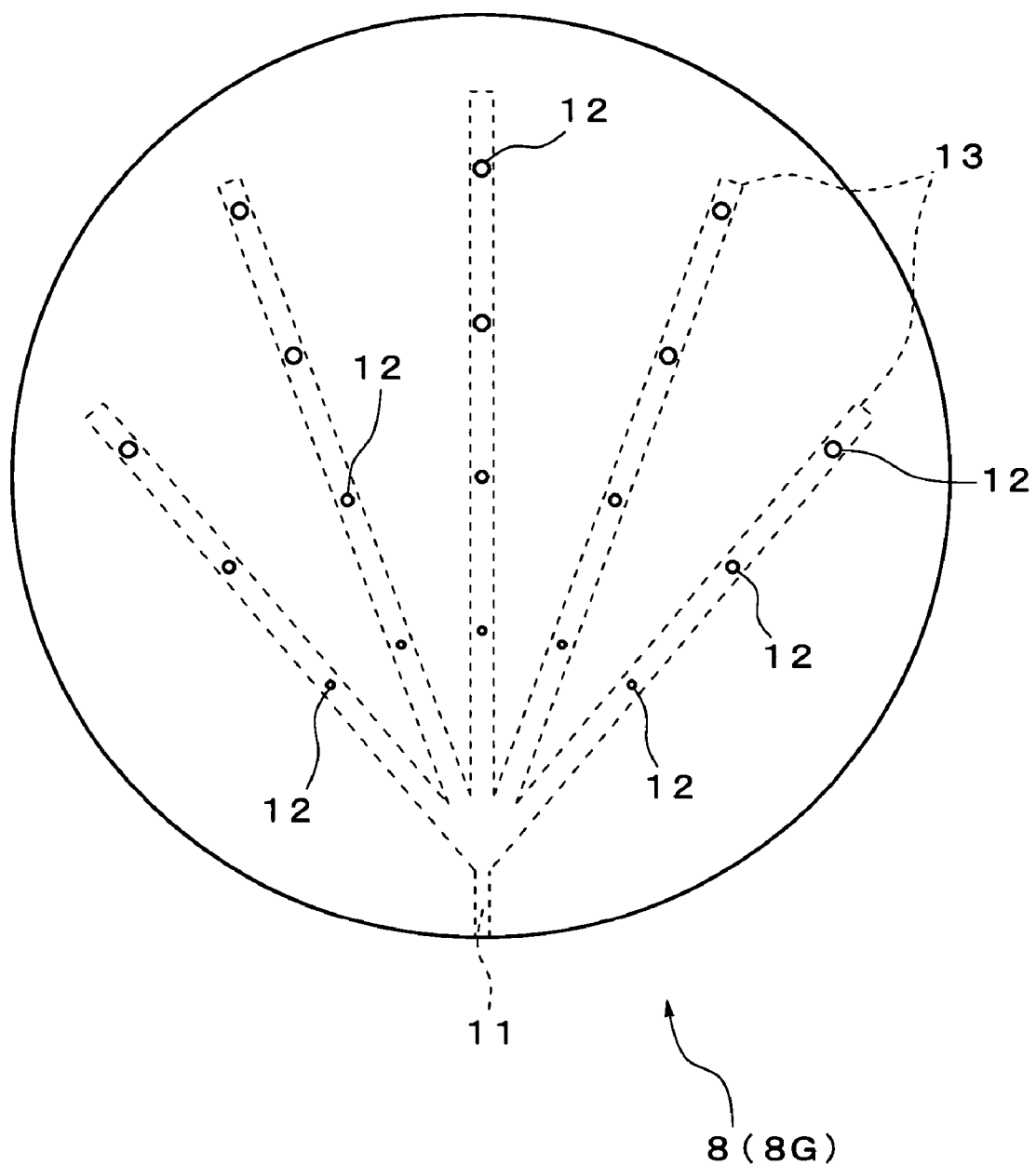
FIG. 10 is a plan view showing a modification of the separator in FIG. 2.

Further, as the separator 8, instead of the hollow parts 10a, 10b, it is possible to use a separator which has an inner flow passage 13 for guiding reactive gas, and which is provided with gas discharge ports 12 along the inner flow passage 13, as shown in FIGS. 8 to 10.

In the separator 8E shown in FIG. 8, the inner flow passage 13 is formed to be a spiral flow passage which has a starting point in the outer peripheral part, while in the separator 8F shown in FIG. 9, the inner flow passage 13 is formed in a zigzag manner from one end to the other end in the radial direction of the layer surface. Further, in the separator 8G shown in FIG. 10, the inner flow passage 13 is formed by multiple flow passages branched radially from the gas inlet 11 provided in the outer peripheral part. In any of the separators 8E, 8F, 8G, the hole diameter of the gas discharge port 12 is set to become large in stages from the upstream side toward the downstream side of the inner flow passage 13.

Further, also in the separators 8E, 8F, 8G, the above described aluminum diffusion coating treatment is applied to the wall surface of the inner flow passage 13.

In the solid oxide fuel cell constituted as described above, the fuel gas introduced into the first hollow part 10a of the separator 8 from the manifold for fuel via the gas inlet 11a in the outer peripheral part of the separator, is discharged like a shower toward the fuel electrode current collector 6 from a number of gas discharge ports 12a provided on approximately whole area on one layer surface 18a of the separator 8, while the oxidizer gas introduced into the second hollow part 10b of the separator 8 from the manifold for oxidizer via the gas inlet 11b in the outer peripheral part of the separator 8, is discharged like a shower toward the air electrode current collector 7 from a number of gas discharge ports 12b provided on approximately whole area on the other layer surface 18b of the separator 8. As a result, the fuel gas and the oxidizer gas are made to spread over the entire surfaces of the fuel electrode layer 3 and the air electrode layer 4 in uniform distribution, so that power generation reaction can be uniformly performed on the electrode-electrolyte interface.

As described above, according to the present embodiment, multiple gas discharge ports 12 are provided on approximately whole area of the layer surface of the separator 8, and the reactive gas (fuel gas, oxidizer gas) is arranged to be discharged like a shower from the gas discharge ports 12 toward the current collectors 6, 7 and each of the electrodes of the power generation cell 5 provided at the side next to the current collectors, as a result of which the gas concentration on the cell face can be made uniform. Therefore, the deviation in the electrode reaction can be suppressed, and the current density within the cell can be made uniform, with the result that the output power density per unit area can be increased and thereby the power generation efficiency of the power generation cell 5 as a whole can be remarkably improved, and that the temperature within the cell can be made uniform and thereby failure of the power generation cell 5 due to thermal stress can be prevented.

Note that the present embodiment is constituted such that multiple gas discharge ports 12 are provided on both of the layer surfaces 18a, 18b of the separator 8, respectively, but the present invention is not limited to this constitution. The present embodiment can also be constituted, for example, in such a manner that multiple gas discharge ports 12 are provided on one layer surface (fuel electrode side), and one gas discharge port 12 is provided in the center part of the other layer surface (air electrode side).

Second Embodiment

Figure 11:
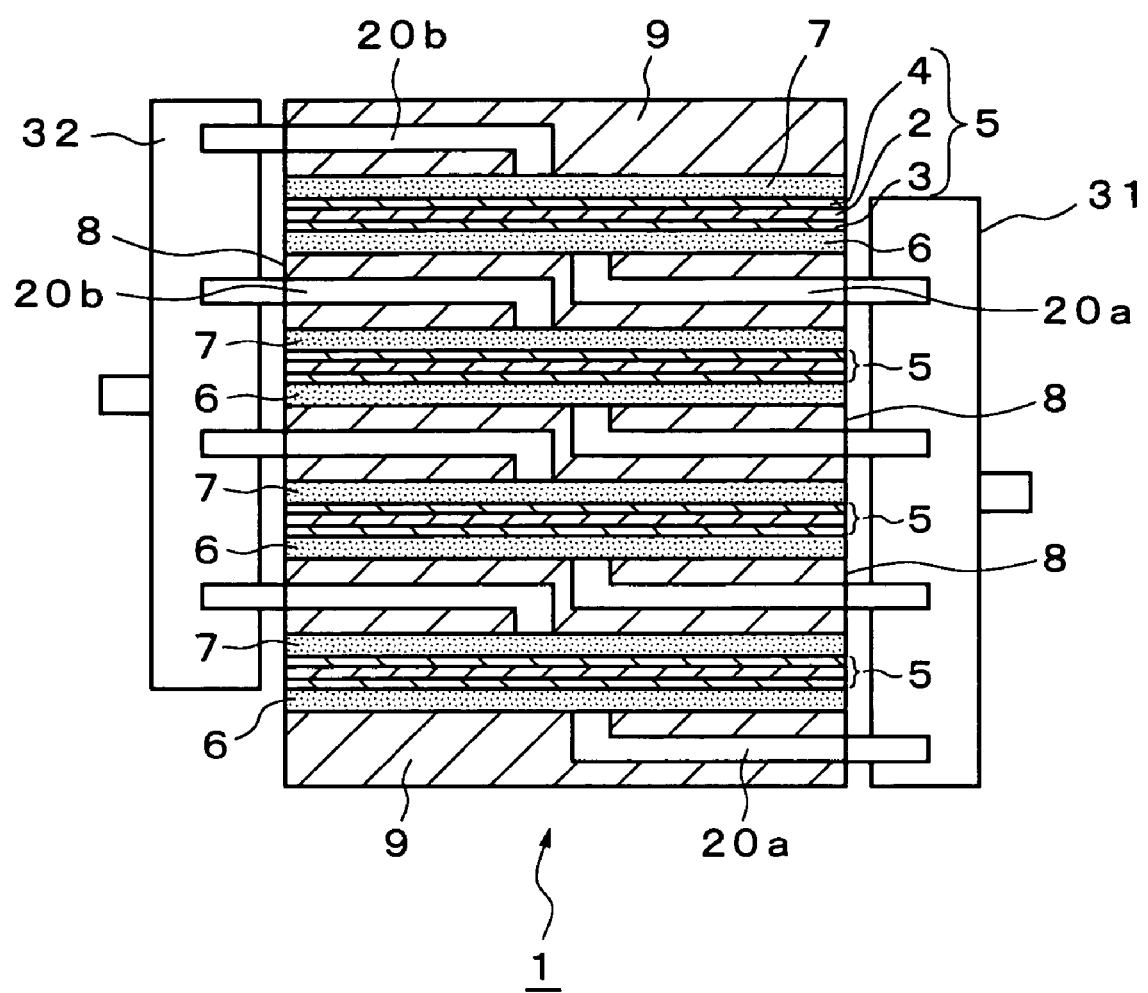
FIG. 11 is a constitution figure showing a major portion of a second embodiment of the solid oxide fuel cell according to the present invention.

FIG. 11 shows a second embodiment of the solid oxide fuel cell according to the present invention, in which the same components as those in the above described first embodiment are denoted by the same reference numerals and the explanation thereof is simplified.

The fuel cell stack 1 according to the present embodiment has a seal-less structure similar to the above described first embodiment, and has a constitution formed by laminating in order a power generation cell 5 in which a fuel electrode layer 3 and an air electrode layer 4 are arranged on both faces of a solid electrolyte layer 2, a fuel electrode current collector 6 on the outer side of the fuel electrode layer 3, an air electrode current collector 7 on the outer side of the air electrode layer 4, and separators 8 (the uppermost and lowermost layers of which are formed as end plates 9) on the outer side of each of the current collectors 6, 7.

The separator 8 has a function to electrically connect the power generation cells 5 to each other, and to supply reactive gas to the power generation cells 5, and is provided with an inner flow passage 20a for introducing fuel gas from a manifold 31 for fuel and for discharging the fuel gas from the surface facing the fuel electrode layer 3, and with an inner flow passage 20b for introducing oxidizer gas from a manifold 32 for oxidizer and for discharging the oxidizer gas from the surface facing the air electrode layer 4, respectively.

Figure 12:
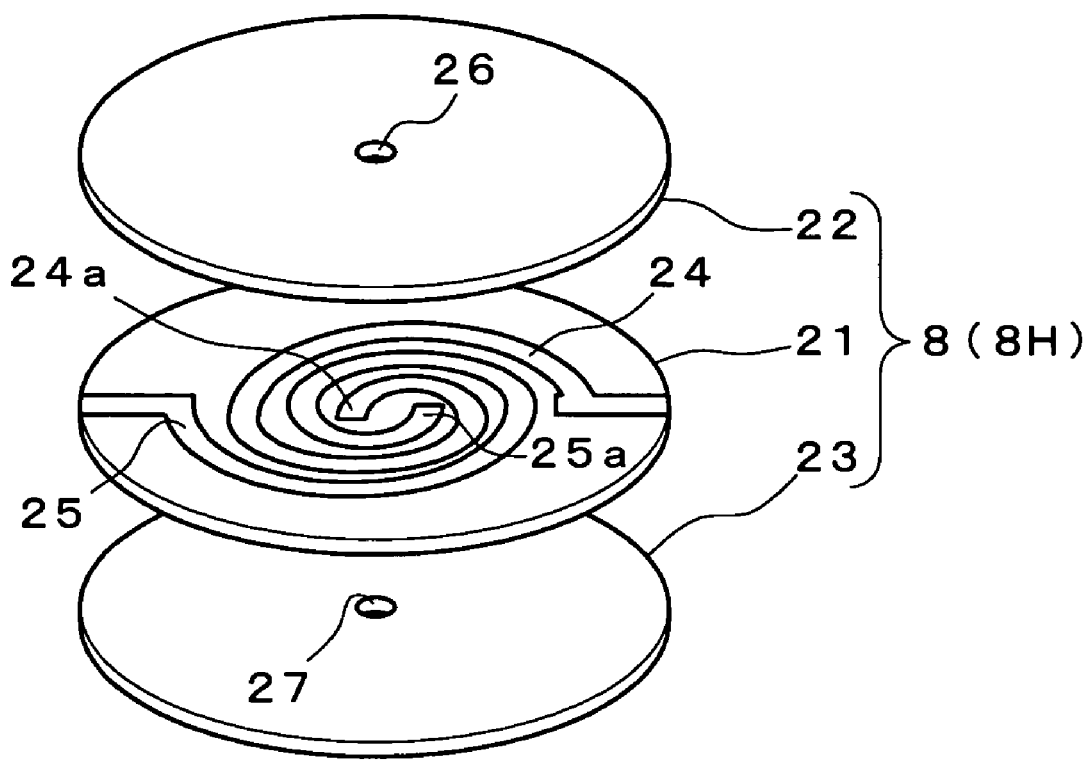
FIG. 12 is an exploded perspective view showing the separator in FIG. 11.

The separator 8H according to the present embodiment is constituted by laminating first to third plate-shaped members 21, 22, 23 formed into an approximately disk-like shape, as shown in FIG. 12. A stainless steel plate (iron based alloy) is used as a base material of the plate-shaped members 21, 22, 23, and both faces of the stainless steel plate are plated with silver or copper, (or can also be plated with a silver alloy or a copper alloy).

In the first plate-shaped member 21, a first spiral groove hole (or spiral slit) 24 leading from one radial end to the center part and a second spiral groove hole (or spiral slit) 25 leading from the other radial end to the center part are formed so as not to intersect with each other. These first and second groove holes 24, 25 are open in the lamination direction of the plate-shaped member, respectively.

In the second plate-shaped member 22, a fuel gas discharge port 26 penetrating in the lamination direction is provided at a position corresponding to the end part 24a of the first groove hole 24. In the third plate-shaped member 23, an oxidizer gas discharge port 27 penetrating in the lamination direction is provided at a position corresponding to the end part 25a of the second groove hole 25.

In the state where the first to third plate-shaped members 21, 22, 23 are laminated, the opening of the first and second groove holes 24, 25 are covered with the second and third plate-shaped members 22, 23, so that inner flow passages 20a, 20b of fuel gas and oxidizer gas are formed, respectively, while the fuel gas discharge port 26 and the oxidizer gas discharge port 27 are formed in the central part of the both end faces adjacent to the current collectors 6, 7 in the state of communicating with the inner flow passages 20a, 20b, respectively.

In order to manufacture the above described separator 8H, first, nickel plating for forming a layer serving as a base is applied to both surfaces of a stainless steel (SUS) roll, and thereafter silver or copper plating is applied on the nickel plating layer. Then, the SUS roll subjected to the silver or copper plating is supplied to a press machine, so that the first to third plate-shaped members 21, 22, 23 which have the groove holes 24, 25 or which have the fuel gas discharge ports 26, 27, are formed by punching operation using the press machine, respectively. Then, the first to third plate-shaped members 21, 22, 23 which are formed by the punching operation are laminated and subjected to heat treatment, so as to soften or melt the plating material on the layer surfaces, as a result of which the plate-shaped members 21, 22, 23 are joined to each other. Consequently, the separator 8H which is formed by integrating the first to third plate-shaped members 21, 22, 23, can be produced. Note that in the above described producing method, the first to third plate-shaped members 21, 22, 23 are formed by punching operation after being subjected to silver or copper plating, but, for example, the silver or copper plating can also be applied after the punching operation is performed. This enables a thin film to be formed on the wall surface of the groove holes and the like by the plating. Further, in the producing method, the nickel plating is arranged to be applied to both surfaces of the SUS roll as a base, but when copper is used as the material plated on the surface of the first to third plate-shaped members 21, 22, 23, or when a nickel based alloy is used as the base material, the nickel plating for forming the base can also be omitted. Further, in the above described producing method, the groove holes 24, 25 and the gas discharge ports 26, 27 of the first to third plate-shaped members 21, 22, 23 are formed by the punching operation using the press machine. However, the producing method according to the present invention is not limited to this method, and the groove holes 24, 25 and the gas discharge ports 26, 27 can be formed by etching as well.

Note that in the case of the end plate 9, the inner flow passage 20a for the fuel gas or the inner flow passage 20b for the oxidizer gas can be formed similarly to the above described separator 8H, by laminating the plate-shaped member in which the first groove hole 24 or the second groove hole 25 is formed, the plate-shaped member which completely close one opening (upper face opening or lower face opening) of the groove holes formed on the plate-shaped member, and the plate-shaped member in which the fuel gas discharge port 26 or the oxidizer gas discharge port 27 are formed, respectively.

In the solid oxide fuel cell constituted as described above, the fuel gas introduced into the inner flow passage 20a of the separator 8 from the manifold for fuel 31 is discharged from the gas discharge port 26 provided in the center part of one end surface of the separator 8 toward the fuel electrode current collector 6, while the air as the oxidizer gas introduced into the inner flow passage 20b of the separator 8 from the manifold for oxidizer 32 is discharged from the gas discharge port 27 provided in the center part of the other end surface of the separator 8 toward the air electrode current collector 7. As a result, the fuel gas and the oxidizer gas are made to spread in excellent distribution over the entire surface of the fuel electrode layer 3 and the air electrode layer 4, while being diffused in the outer peripheral direction of the power generation cell 5, so that power generation reaction is generated in each of the electrodes.

As described above, according to the present embodiment, a stainless steel plate (iron based alloy) is used as a base material of the plate-shaped members 21, 22, 23, and both surfaces of the stainless steel plate are plated with silver or copper, so that all parts including not only the surface of separator 8 but also the wall surface of the inner flow passages 20a, 20b and the like, which are exposed to the fuel gas, are covered with a thin film of silver or copper. Thereby, the carburizing resistance of the separator 8 can be remarkably improved and deterioration of the separator 8 caused by carburization can be prevented, even in the case where methane gas and the like is used as the fuel gas. Further, both surfaces of the plate-shaped members 21, 22, 23 are arranged to be plated with silver or copper, so that the plate-shaped members 21, 22, 23 can be easily joined to each other by softening or melting the silver or copper plated on the layer surface of plate-shaped members 21, 22, 23 by heating the separator 8. Thereby, the production efficiency of the separator 8 can also be improved.

Figure 13:
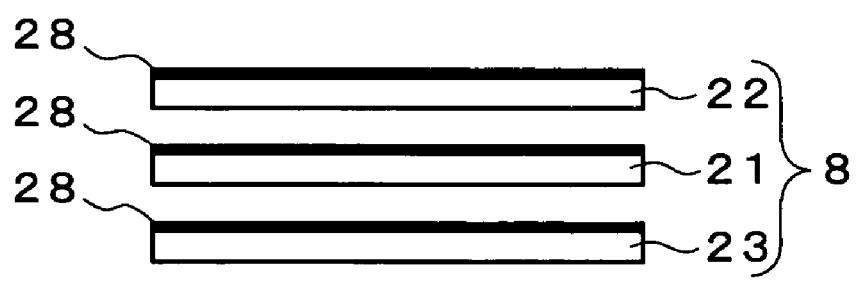
FIG. 13 is an explanatory view showing an example of a plating treatment of plate-shaped members.

Further, in the above described embodiment, both surfaces of all the plate-shaped members 21, 22, 23 to be laminated are arranged to be plated with silver or copper, but, as shown as an example in FIG. 13, a silver or copper plating layer 28 may be arranged to be formed only on each one of the surfaces of the multiple plate-shaped members 21, 22, 23 which are brought into contact with each other at the time of lamination. Note that even when each of the plate-shaped members has such one-side plating structure, the plate-shaped members can be joined to each other by softening or melting the plating layer 28 by heating the separator 8, similarly to the above described case. According to such method, it is possible to reduce the plating area of the plate-shaped members 21, 22, 23 (that is, the use amount of plating material), and thereby to reduce the cost.

Further, in the present embodiment, as to the wall surface of the inner flow passage (namely, of the first groove hole 24, the second groove hole 25, the fuel gas discharge port 26, the oxidizer gas discharge port 27) particularly exposed to reactive gas, the surface of the iron based alloy which is the base material of the wall surface may be arranged to be subjected to an aluminum diffusion coating treatment, instead of the silver or copper plating treatment as described above. The aluminum diffusion coating treatment is a metal surface treatment which makes aluminum diffused and penetrated through the surface of the base material so as to form a Fe—Al alloy layer, and which is performed, for example, in such a manner that the base material is filled in a steel sealed case along with a mixing agent consisting of Fe—Al alloy powder and $NH_4Cl$ powder so as to be heat-treated. The Fe—Al alloy layer formed in this way enables the high temperature oxidation resistance and the carburizing resistance of the separator to be further improved.

Note that the aluminum diffusion coating treatment may be applied to each of the first to the third plate-shaped members 21, 22, 23 before the plate-shaped members are laminated in the above described production process of the separator 8, or may be performed after the inner flow passage is formed by laminating and joining the first to the third plate-shaped members 21, 22, 23.

Further, in the present embodiment, the separator 8H is arranged to be formed by laminating the first to the third plate-shaped members 21, 22, 23, but the lamination number of the plate-shaped members is not limited to three. The lamination number may be four or more. Further, in the present embodiment, the first and the second groove holes 24, 25 are collectively formed on one plate-shaped member, but may be separately formed on different plate-shaped members.

Further, in the present embodiment, the separator 8H which has a gas discharge port in the center part of each layer surface (surface facing the power generation cell 5) is exemplified, but the present invention is not limited to this. For example, as shown in FIG. 4 to FIG. 10, also in the case of the separators 8A, 8B, 8C, 8D, 8E, 8F, 8G which have multiple gas discharge ports formed on approximately whole area of the layer surface, the separator can be similarly constituted by laminating multiple plate-shaped members which are formed by making one or both surfaces of the base material made of an iron based alloy, a nickel based alloy or a chromium based alloy plated with silver, a silver alloy, copper, or a copper alloy, (for example, the plate-shaped member in which multiple gas discharge ports 12a are formed, the plate-shaped member in which the hollow part 10a or the groove hole corresponding to the inner flow passage 13 is formed, the plate-shaped member constituting the partition wall 14, the plate-shaped member in which the hollow part 10b or the groove hole corresponding to the inner flow passage 13 is formed, the plate-shaped member in which multiple gas discharge ports 12b are formed, and the like).

According to the present invention, gas concentration on the cell face can be made uniform and thereby the power generation efficiency can be improved, while the temperature distribution within the cell can also be made uniform and thereby failure of the power generation cell can be prevented. Further, deterioration caused by carburization can be suppressed, even in the case where a hydrocarbon compound, such as methane, is used as the fuel gas. Therefore, the durability of the separator can be improved, so that the separator and the solid oxide fuel cell can be used stably over a long period.

The invention claimed is:

1. A separator for a fuel cell which is arranged in alternate lamination with a power generation cell, the separator comprising:
    multiple gas discharge ports for discharging reactive gas, on a layer surface thereof; and
    an inner flow passage for guiding the reactive gas, wherein the multiple gas discharge ports are provided along the inner flow passage,
    wherein the multiple gas discharge ports are provided on approximately a whole area of the layer surface and the reactive gas is made to be discharged like a shower from the gas discharge ports toward the power generation cell, and
    wherein the inner flow passage is a spiral flow passage having a starting point in the outer peripheral part of the separator.

2. A separator for a fuel cell which is arranged in alternate lamination with a power generation cell, the separator comprising:
    multiple gas discharge ports for discharging reactive gas, on a layer surface thereof; and
    an inner flow passage for guiding the reactive gas, wherein the multiple gas discharge ports are provided along the inner flow passage,
    wherein the multiple gas discharge ports are provided on approximately a whole area of the layer surface and the reactive gas is made to be discharged like a shower from the gas discharge ports toward the power generation cell, and
    wherein the inner flow passage is formed in a zigzag state from one end toward the other end in the radial direction of the layer surface.

3. A separator for a fuel cell which is arranged in alternate lamination with a power generation cell, the separator comprising:
    multiple gas discharge ports for discharging reactive gas, on a layer surface thereof; and
    an inner flow passage for guiding the reactive gas, wherein the multiple gas discharge ports are provided along the inner flow passage,
    wherein the multiple gas discharge ports are provided on approximately a whole area of the layer surface and the reactive gas is made to be discharged like a shower from the gas discharge ports toward the power generation cell, and
    wherein the inner flow passage is formed by multiple flow passages radially branched from a gas inlet in the outer peripheral part.

* * * * *